United States Patent Office 3,792,133
Patented Feb. 12, 1974

3,792,133
METHOD FOR SLIP-FORMING WALLS OF ASYMMETRICAL TRANSVERSE CROSS SECTION
Roy Robert Goughnour, Mason, Mich., assignor to A. C. Aukerman Co., Jackson, Mich.
Filed June 30, 1972, Ser. No. 268,159
Int. Cl. E04b 1/16
U.S. Cl. 264—33                         3 Claims

ABSTRACT OF THE DISCLOSURE

The invention pertains to a method for forming elongated concrete structures, such as walls and the like, by slip forming. In particular, the invention is directed to the concept of slip-forming walls of asymmetrical transverse cross section as required in the forming of highway barrier walls. The concrete slip form includes opposite sidewalls and open front and rear ends. At least one of the sidewalls is vertically adjustable wherein the sidewall configuration being formed thereby may have a height variance with respect to the opposite sidewall being formed. The form includes fixed wall portions associating with the adjustable wall portion and power means permit adjustment of the vertical adjustable wall. It is also within the scope of the invention to provide a form wherein both sidewalls are vertically adjustable, and the form includes means for introducing steel reinforcement into the formed wall, and periodically permitting accessory equipment to be embedded into the wall.

BACKGROUND OF THE INVENTION

The invention pertains to the field of forming concrete structures, such as walls, by slip forming. When forming elongated structures of concrete it has long been recognized that a traveling mold or form can be employed to economically shape such concrete structures. Concrete pipe has been formed by slip molding processes for many years, as have street curbs and the like. Concrete curbs and gutters may also be formed by slip forms and walls may likewise be so constructed as long as the wall is of a relatively low height, and able to retain its form once released from the mold, and prior to the concrete hardening. Typical concrete slip form devices for conduits are shown in U.S. Pats. 3,106,760; 3,551,537 and 3,562,056. Apparatus for slip forming curbs and gutters are shown in Pats. 2,818,790; 3,161,117; 3,175,478 and 3,261,272.

In the formation of concrete structures of considerable height, such as a wall, by using slip form techniques, the form or screed, as it is often designated, consists of a pair of parallel sidewalls and is open at the front and rear ends. The form is mounted upon a suitable wheeled support for continuous movement during formation of the wall, and a hopper is associated with the front end of the screed into which concrete is supplied. The concrete is normally subjected to vibration in the hopper and as it passes through the form in order that the concrete will completely fill the form cross section, and as the form shapes the wall, the wall will maintain the configuration determined by the form sidewalls and harden. Of course, when slip forming a wall of a height of two or three feet, for instance, the concrete introduced into the form is very viscous and "dry" in order that its "flow" characteristics are minimized and its ability to be free standing is high.

The lower edges of the slip form normally either engage the ground, or the foundation, upon which the concrete structure is to be supported, and must be close enough to the ground or foundation to prevent the concrete from flowing under the sidewalls.

Of course, the configuration of the sidewalls of the screed may be as desired in order to form a wall having a given cross-sectional configuration. In effect, a concrete structure formed by slip forming is "extruded" from the slip form, and the cross-sectional configuration thereof is determined by the configuration of the screed adjacent its open rear end.

In the construction of highway expressways and freeways the median often includes a barrier wall dividing the highway lanes bearing traffic flowing in opposite directions. In particular, such barrier walls are employed in urban areas wherein the median is of minimum width and a barrier is required to separate adjacent lanes of traffic traveling in opposite directions. Such barrier walls, in the past, normally consisted of steel or wooden posts inserted into the ground upon which guard rails are mounted. Concrete barrier walls are now being increasingly used by highway departments, and such walls are often formed by concrete slip forming apparatus.

The conventional cross-sectional configuration of concrete highway barrier walls includes a wide base which usually is defined by vertical sides, the configuration then tapers upwardly and inwardly, and at the third stage tapers upwardly at a decreased rate to the upper wall edge. This particular type of configuration has been designed to provide sufficient strength to resist impact forces and has also been designed to provide optimum "rebound" characteristics, as well as minimize the concrete requirements and produce an aesthetically pleasing and mechanically efficient structure. Concrete barrier walls, when of a longitudinally linear configuration, are usually symmetric with respect to a central vertical plane, assuming the grade and highway level on each side of the wall to be the same. However, in instances wherein the grade or highway line on opposite sides of the wall is different, the configuration of the wall sides must vary to accommodate the difference in grade lines. Thus, it is not uncommon for a highway concrete barrier wall to be asymmetrical in cross section with respect to the wall central vertical plane. Such asymmetrical barrier wall configurations can be produced by shaping the sidewalls of the form or screed as desired. However, as the configuration of the screed sidewalls are fixed, it is not possible to vary the wall configuration during wall formation.

Previously, it has not been possible to use concrete highway barrier walls economically in those instances where the highway defines a curve, or otherwise departs from a linear or straight length. As a highway defines a curve the highway or road surface is "banked" to compensate for centrifugal forces imposed upon the vehicle as it travels through the curve and a barrier wall constituting the median of a divided highway on a curve will separate different grade or road lines due to the banked configuration of the highway. As one side of the barrier wall is adjacent the outer edge of the inside highway, and as the other side of the barrier wall defines the inner edge of the outer highway, a difference of 12" or more in the grade line on opposite sides of the barrier wall often exists. As it is important that at all locations on the curve that the configuration of the lower regions of the barrier wall be constant with respect to the adjacent road surface, is is necessary to change the barrier wall cross-sectional configuration in proportion to the radius of the curve being defined. Thus, it will be appreciated that as most highway curves constitute a plurality of radii, it is not possible to form a highway barrier wall of varying transverse cross-sectional asymmetrical configuration by conventional slip form apparatus. Thus, on curves, or where the transverse cross-sectional configuration of the barrier wall must be continually varied, concrete barrier wall has not been formed heretofore by slip molds or screeds, or if concrete barrier wall is used on curves it is formed by conventional stationary forms by laborious hand methods, resulting in very expensive installations.

SUMMARY OF THE INVENTION

It is an object of the invention to provide a method and an apparatus for forming concrete walls, such as highway barrier wall, wherein the cross-sectional configuration of the wall may be infinitely varied during wall formation, and a highway barrier wall may be formed along a curve wherein predetermined dimensional characteristics may be maintained between the grade line and the wall configuration regardless of varying differences in the grade line elevation on opposite sides of the wall.

In the practice of the invention a mold or screed is utilized having sidewalls and open front and rear ends. The front end of the screed communicates with a hopper into which concrete is introduced, and the formed concrete passes from the screed rear end as the screed is moved in the desired direction during wall construction. At least one of the screed sidewalls is vertically adjustable with respect to the other sidewall, and means are provided for varying the vertical position of the sidewall during linear movement of the screed in a direction parallel to the sidewall length. Such vertical positioning of the adjustable sidewall is accomplished by power means which is preferably controlled by automatic sensing devices sensing a guideline related in a predetermined manner to the desired resultant configuration and grade line.

The screed is formed such that the adjustable sidewall is adequately supported during all positions of adjustment as to prevent displacement due to the weight of the concrete confined therein. In the disclosed embodiments screw means are employed to vertically position the adjustable sidewall, but other power means such as hydraulic or air operated expansible motors could be utilized.

It is a further object of the invention to provide a slip form screed having opposed sidewalls which are each adjustable relative to the other wherein increased flexibility of operation may be achieved as compared with a screed having a single vertically adjustable sidewall. In this type of double adjustable sidewall screed a double highway curve can be followed without reversing the direction of screed movement, and a versatility of operation is achievable which is very desirable.

As is well known, it is highly desirable to reinforce concrete structures by embedding steel rods, fence, mesh, or a similar reinforcement within the concrete, and it is an object of the invention to provide apparatus wherein reinforcing components may be introduced into a highway barrier wall as the wall is slip formed. In this regard, an opening is defined at the forward end of the hopper in alignment with the screed front end wherein the reinforcement is aligned with the wall cross section and directly introduced into the screed as the wall is shaped thereby. Sealing means in the form of flaps prevent the concrete from escaping from the hopper through the reinforcement receiving opening.

Additionally, it is often desired that electrical outlets or service boxes, lamp supports, or other components being incorporated into a barrier wall, or the barrier wall foundation, during construction, and means are provided with the apparatus in accord with the invention to accommodate the incorporation of such components into a wall, or foundation, formed by a slip form or screed.

In addition to the above objects, it is desired that the slip form in accord with the invention be useable with available vehicle support equipment, and the screed in accord with the invention may be employed with available slip form support vehicles.

It is therefore appreciated that a basic object of the invention is to provide a concrete slip form capable of producing a highway barrier wall of varying transverse cross-sectional configuration for accommodating different grade levels on opposite sides of the wall, and wherein variations in the wall cross-sectional configuration may be readily accomplished during wall formation without requiring stopping, realignment or other interruptions in the screed movement during wall forming.

BRIEF DESCRIPTION OF THE DRAWINGS

The aforementioned objects and advantages of the invention will be understood from the following description and accompanying drawings wherein.

DESCRIPTION OF THE PREFERRED EMBODIMENTS

The invention is directed to method and apparatus pertaining to the slip forming or molding of concrete. However, to best understand the environment in which the preferred embodiment is utilized, the description is directed to the formation of a highway barrier wall as used to separate lanes of traffic of multilane highways, expressways and freeways.

Figures 1, 2, 3:
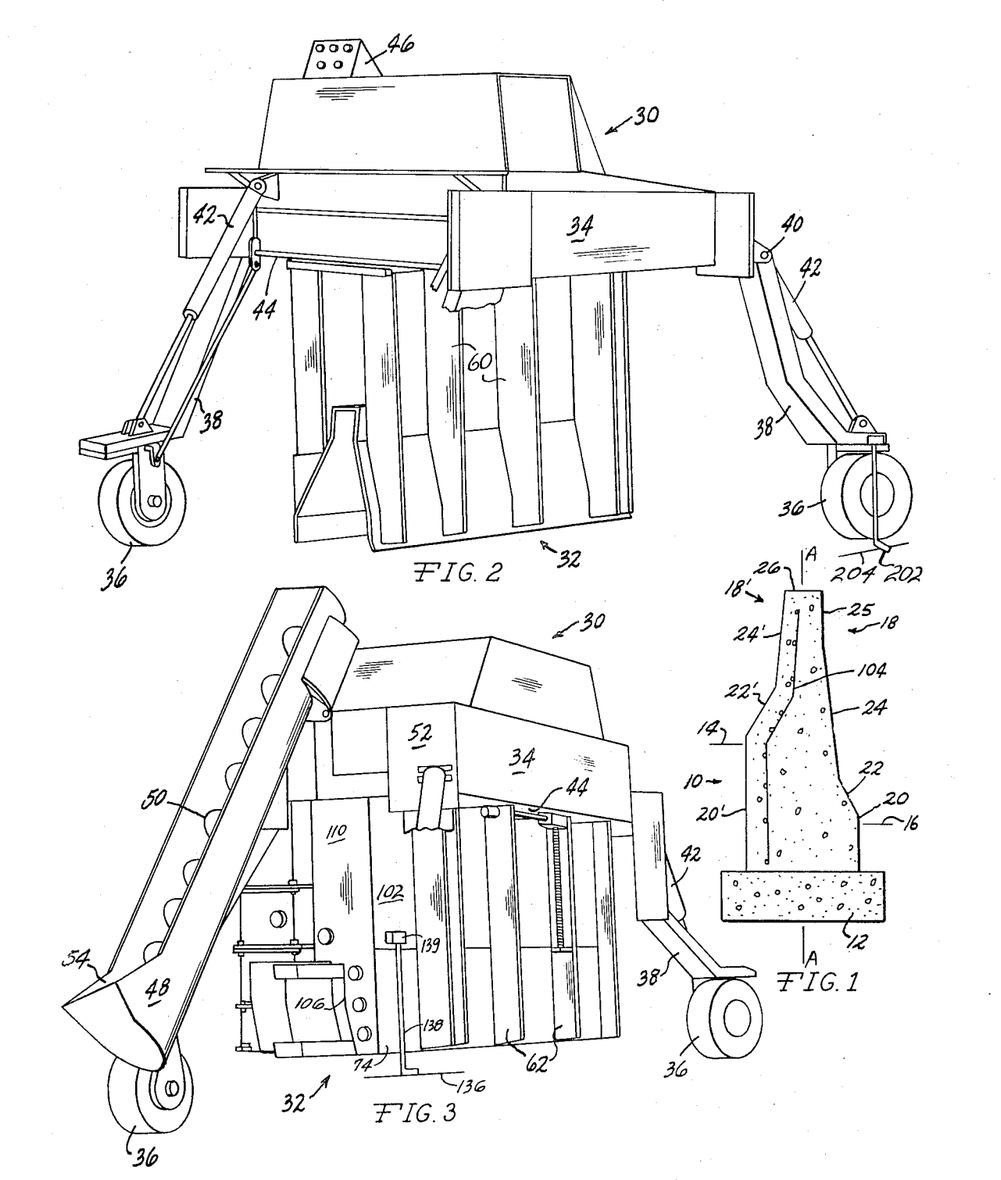
FIG. 1 is a transverse, cross-sectional view of a highway barrier wall of asymmetrical configuration of the type formed by the practice of the invention.
FIG. 2 is a rear and side perspective view, partially cut away, of the support vehicle and slip form used in the practice of the invention.
FIG. 3 is a front and side perspective view as taken from the right side of the apparatus illustrated in FIG. 2.

In FIG. 1 a typical highway barrier wall 10 as constructed by the method and apparatus is illustrated. The wall 10 is supported upon a concrete foundation 12 of conventional construction. The grade elevation lines on each side of the wall 10 are represented at 14 and 16. These grade lines are, as will be obvious from FIG. 1, at different vertical levels, and this difference in elevation is usually due to the elevational differences required in the formation of highway curves, which are banked in order to resist centrifugal forces imposed upon moving vehicles. In practice, the difference between grade elevations 14 and 16 may vary from 2" to 18" or more.

Each side of the barrier wall 10 consists of surfaces of generally similar configuration, except that the vertical dimension of several of the surfaces differ due to the difference in elevation between grade lines 14 and 16. For instance, sidewall 18 includes a substantially vertical extending surface 20 which may rise approximately 3" above the associated grade line 16. Thereupon, an obliquely disposed surface 22 extends inwardly having a vertical rise of approximately 10″. The surface 24 of sidewall 18 is obliquely related to the vertical and substantially vertical surface 25 extends to the wall top surface 26 from surface 24. The surfaces 20, 22 and 24 are designed to produce optimum impact and rebound characteristics when engaged by vehicle tires, bumpers, and the like, and thus it is desired that the relative dimensional relationships of the surfaces 20, 22 and 24 on each side of the barrier wall be the same with respect to the adjacent grade line. The opposite sidewall 18′ includes similar surfaces indicated by primes, however, due to the difference in elevation of the grade lines 14 and 16 the vertical dimension of the wall surfaces 25 and 20′ will vary, and it is readily appreciated that the cross-sectional configuration of the barrier wall is asymmetrical with respect to the central line or plane A—A of the wall as illustrated in FIG. 1. The width of the wall top surface 26 will usually vary between 6″ and 10″ while the maximum width of the wall will usually be about 24″.

As previously described, the difference in elevation between the grade lines 14 and 16, when existing due to the "banking" of highway curves, will vary according to the radius of the curve at any given point. Thus, in the construction of a barrier wall of the configuration shown in FIG. 1, the vertical dimension of the surfaces 25 and 20′ will vary, and in a curve having various radii of curvature, the vertical height of these surfaces will continuously vary throughout the longitudinal length of the barrier wall.

Of course, it will be appreciated that the grade elevations 14 and 16 are established after the barrier wall has been formed, and that during pouring of the wall the grade level on both sides of the wall will be no higher than the foundation 12.

The barrier wall shown in FIG. 1 is formed by a slip form or screed 32 mounted upon a wheeled support vehicle 30, as shown in FIGS. 2 and 3. The vehicle 30 may take various forms, and the vehicle itself constitutes no part of the present invention. The vehicle that is illustrated and used in the practice of the invention is manufactured by Huron Manufacturing Company of Huron, South Dakota, and this type of vehicle is commonly used for slip forming concrete structures such as curb and gutters, and the like.

With reference to FIGS. 2 and 3, the vehicle 30 consists of a body 34 including a housing in which an internal combustion engine is located driving a generator, oil pumps and other auxiliary equipment. The support vehicle is of a generally rectangular configuration, and is mounted upon four rubber tires 36 rotatably supported upon pivotally mounted arms 38 located at each corner of the vehicle. The arms 36 are pivotally connected to the body, for pivoting about a horizontal axis 40, and the angular relationship of the arms is adjusted by an expansible motor 42 pivotally connected to the body and pivotally connected to the associated arm. Thus, the arms 38 may be pivoted to raise or lower the body 34 by operation of the motors 42. In the larger sizes of vehicle 30 the lower mounting surface 44 of the body may be lowered close to ground level, or may be raised to a height of approximately seven feet when the motors 42 are fully extended. The wheels 36 are each driven by a rotary hydraulic motor, and operation of the support vehicle is controlled from control panel 46.

The front end of the support vehicle 30 includes a concrete chute 48 having a screw auger 50 rotatably located therein, and the upper end of the conveyor is open, and disposed above a hopper 52, FIG. 3, whereby concrete may be introduced into the lower end 54 of the conveyor, and discharged from the upper end thereof into the hopper.

The slip form or screed 32 in accord with the invention is mounted to the vehicle mounting surface 44 and includes a body 56 formed by a plurality of bridge elements 58, formed of steel plate, defining the upper portion of the screed. The bridge elements 58 are welded to column-like members 60 disposed upon the right side of the screed, and column members 62 extending along the left side of the screed. The column members are welded to their associated bridge members, and the various bridge members and columns are spaced along the axial length of the screed, each assembly defining an inverted U-shaped configuration.

Figure 7:
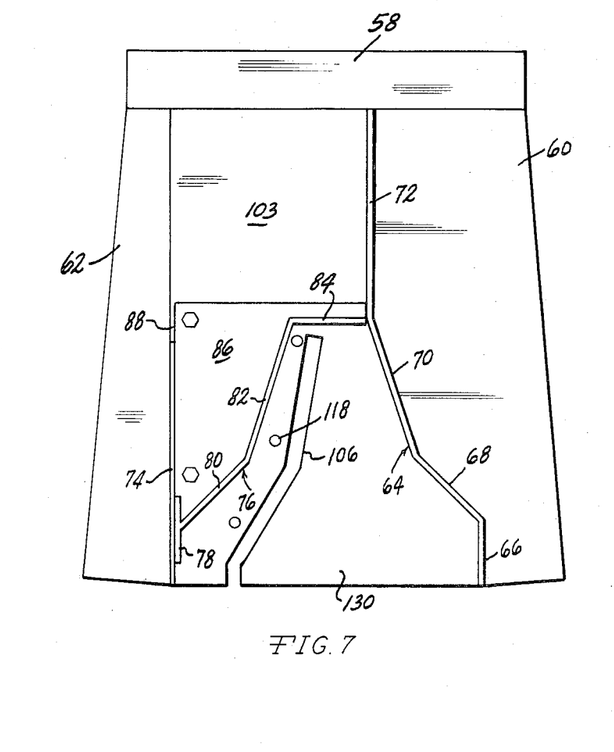
FIG. 7 is a rear, elevational end view of a slip form constructed in accord with the invention, the vertically adjustable sidewall being illustrated in the lowermost position.
Figure 8:
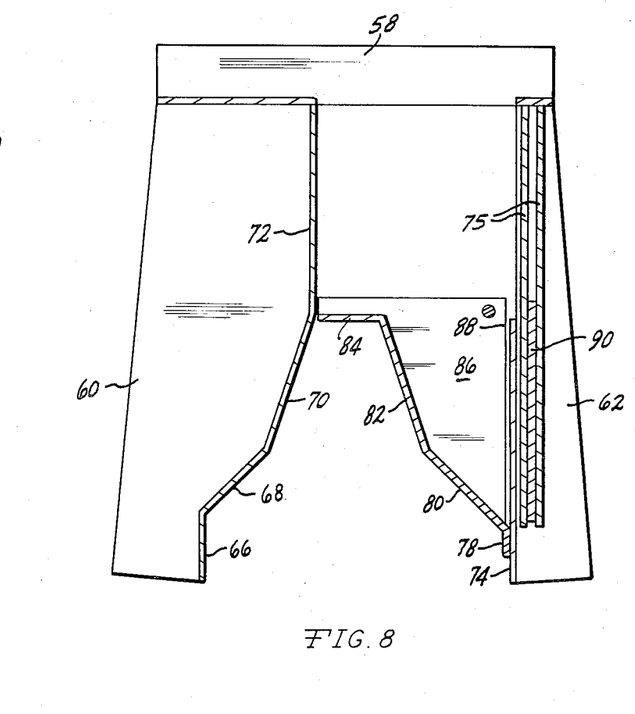
FIG. 8 is a transverse sectional view taken along section VIII—VIII of FIG. 6.

The inner edge of the right columns 60, FIG. 7, is formed with a configuration, at least partially, corresponding to the configuration of side 18 of the barrier wall to be formed. In this manner the stationary longitudinally extending sidewall 64 of the screed is formed by a steel plate, which may consist of a plurality of planar plates welded to the inner edge of the columns 60, or may be formed to correspond to the column inner edges. The sidewall 64 includes a vertically extending portion 66, an obliquely extending portion 68, an oblique portion 70, and a vertically extending portion 72. Upon comparison with the barrier wall cross section shown in FIG. 1 it will be appreciated that the screed sidewall portion 66 defines the wall surface 20, the screed portion 68 defines wall surface 22, screed sidewall portion 70 forms barrier wall surface 24 and portion 72 forms surface 25.

A vertically extending plate 74 is welded to the inner side of the columns 62 and is of a planar configuration and a pair of spaced, parallel guides 75 are welded to two of the columns 62.

The adjustable sidewall 76 of the screed is formed by a contoured plate which includes a vertical portion 78 having an outer edge engaging the plate 74, an obliquely disposed portion 80, which forms the barrier wall surface 22′, a second obliquely disposed portion 82 which forms the barrier wall surface 24′, and a horizontally disposed portion 84 which forms the barrier wall top surface 26.

The form of the sidewall plate 76 is maintained by a plurality of reinforcing ribs 86 formed of heavy steel plate transversely disposed to the length of the plate 76 and spaced therealong. The ribs 86 are provided with edges corresponding to the configuration of the plate 76, and include an outer edge 88 disposed toward the columns 62. The ribs 86 include guide members 90 received within the guide members 75 defined upon the columns 62, and thus it will be appreciated that the sidewall plate 76, and the reinforcing ribs 86 are capable of vertical adjustment upon the columns 62, and vertical adjustment with respect to the fixed sidewall plate 64.

Figure 6:
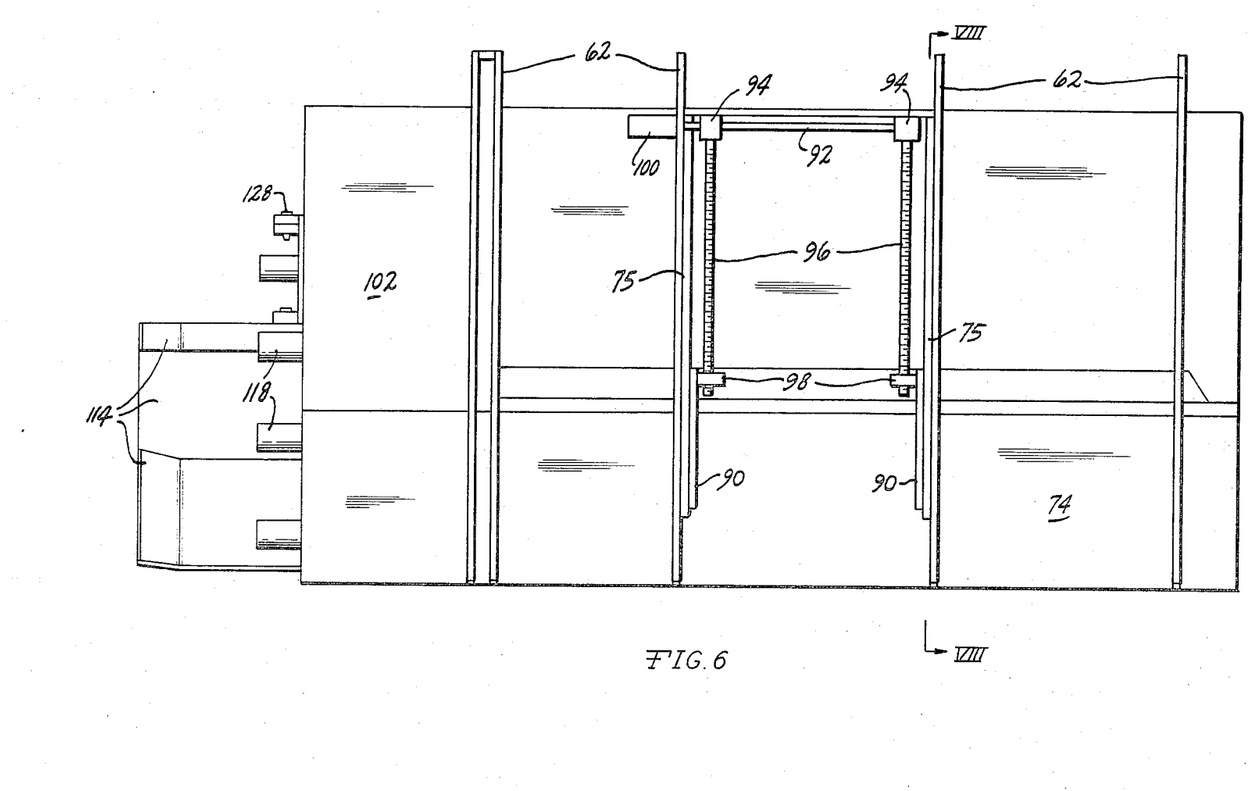
FIG. 6 is a side elevational view of the left side of the slip form in accord with the invention.

Vertical adjustment of the sidewall 76 is accomplished through a screw type actuator. As will be appreciated from FIG. 6, a horizontally disposed drive shaft 92 is rotatably mounted upon the screed structure, and includes a pair of right angle drive units 94 from which depend threaded rods 96. The threaded rods 96 each cooperate with a nut member 98 mounted upon a reinforcing rib 86 of sidewall 76, such that rotation of the drive shaft 92 simultaneously rotates the rods to raise and lower the sidewall 76. The drive shaft 92 is preferably rotated in a very accurate manner by a rotatable hydraulic motor 100 supplied with pressurized hydraulic fluid from pump and control apparatus, not shown, mounted on the support vehicle 30.

At the front of the screed 32 a vertically disposed hopper 102 is formed which is open at the upper and lower ends. The upper end of the hopper 102 is in alignment with the hopper 52 defined on the support vehicle whereby concrete received from the hopper 52 is discharged into the hopper 102. The hopper 102 directly communicates with the front end of the screed 32, which is open throughout its vertical height into the hopper. The hopper 102 includes a rear wall 103 which is affixed to the front end of the adjustable sidewall 76 and hopper side plate 105 is also vertically movable with sidewall 76 as is the hopper front wall 110. As will be noted in FIG. 6, the front end of plate 74 extends forwardly to telescope with hopper wall 105.

Figures 4, 5, 5A:
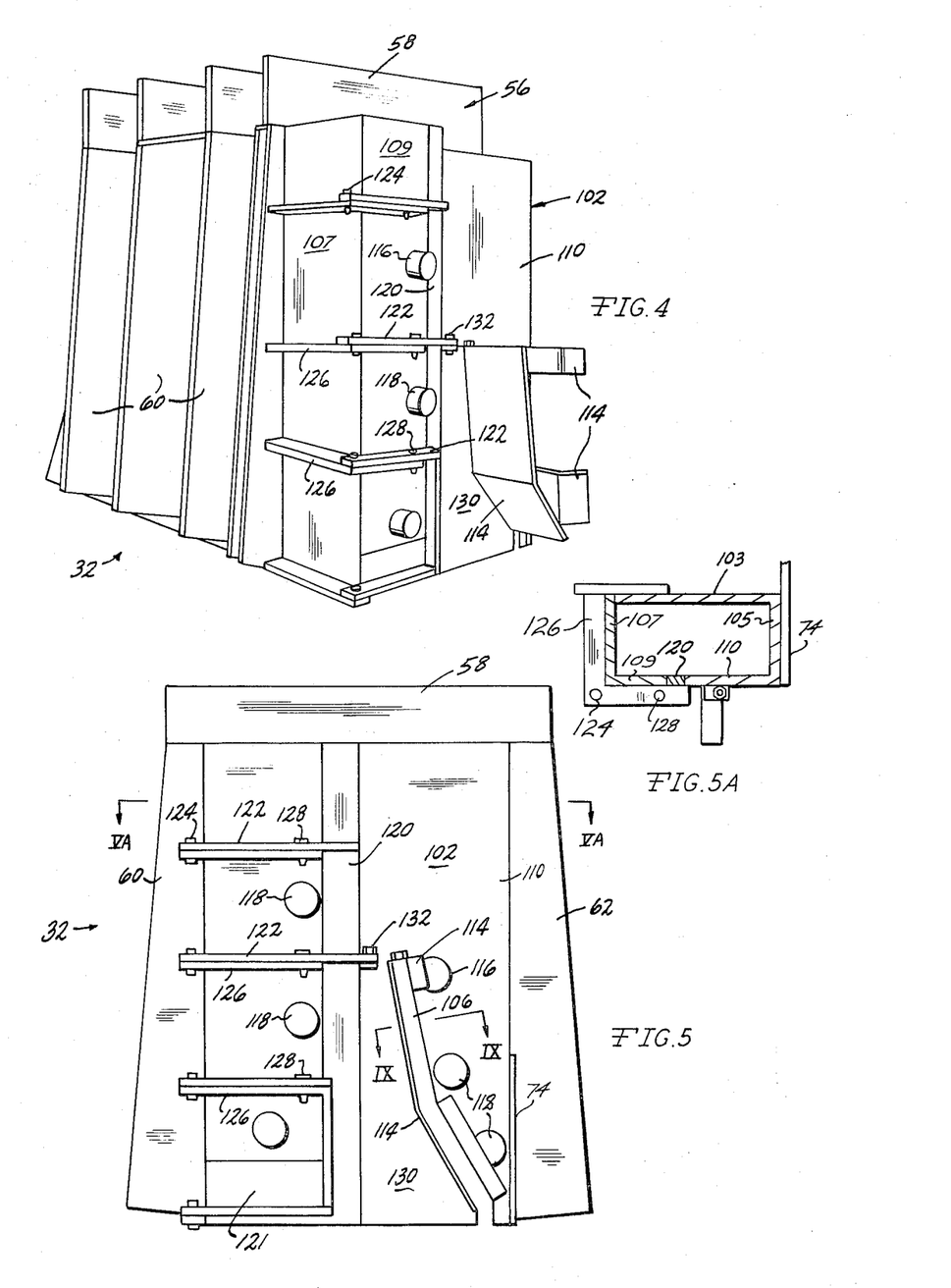
FIG. 4 is a right side and front perspective view of a slip form constructed in accord with the invention.
FIG. 5 is a front, elevational view of the slip form.
FIG. 5A is a sectional plan view through the hopper taken along sections VA—VA of FIG. 5.

It is desirable that the barrier wall 10 be reinforced by steel reinforcement mesh or fence 104, and such reinforcement is introduced into the screed through a reinforcement receiving opening 106, FIG. 5. The opening 106 has a vertical configuration somewhat similar to the configuration of the barrier sidewall 18 wherein a reinforcement mesh may be fed into the opening 106 in line with the barrier wall as to be located in a manner within the wall as apparent in FIG. 1.

Figure 9:
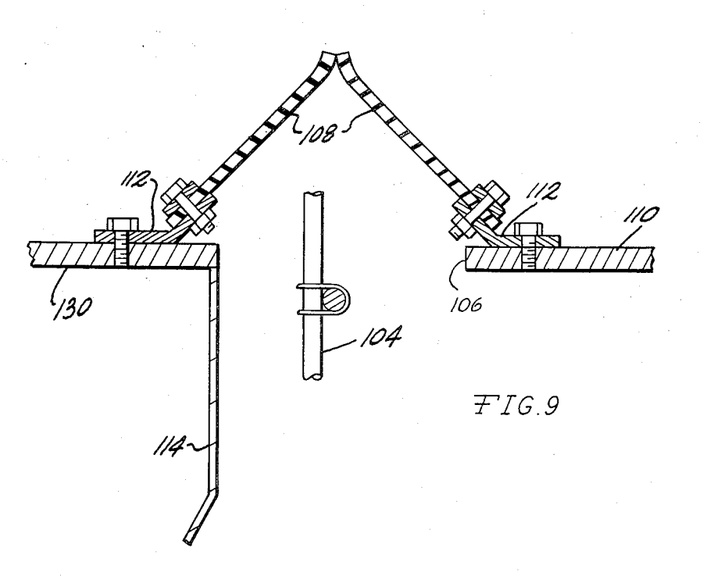
FIG. 9 is a detail, enlarged sectional view taken through the reinforcement receiving opening as taken along section X—IX of FIG. 5.

In order to prevent the concrete within the hopper 102 from passing through the reinforcement opening 106 flexible lips 108 are used to close the opening, yet permit entry of the reinforcment mesh into the hopper and screed. With reference to FIG. 9, the lips 108 may be formed of rubber or similar material, and are mounted upon the hopper front wall 110 by means of brackets and nut and bolt connections 112. The oblique disposition of the lips 108 to each other causes the pressure imposed upon the lips due to the concrete within the hopper to close the lips, but readily permits the reinforcement to pass between the lips without damage thereto.

Guide plates 114 are located upon each side of the opening 108, attached to the hopper wall 110, for guiding the reinforcement mesh into the opening. Holes 116 are also formed in the hopper wall 110 for receiving electric vibrators 118 which extend into the hopper, and partially into the screed 32, between the sidewalls thereof to vibrate the concrete and increase the density thereof, as is well known in the concrete art.

The hopper 102 is also formed with an elongated door or removable panel 120 having an enlarged panel at 121 for providing access to the hopper whereby electric service boxes, or the like may be inserted into the hopper, and placed within the barrier wall foundation prior to final formation of the barrier wall by the screed. The door or removable panel 120 includes hinge plates 122 welded thereto, and hinge pins 124 upon the plates 122 pivotally cooperate with plates 126 mounted upon the hopper walls 107 and 109 whereby the hinge axes of the pins are coaxial permitting the door to be swung about the pin axis providing access to the hopper throughout its vertical height. The hopper door is locked in the closed position by locking pins 128 extending through holes defined in plates 122 and 126, which align upon the pivotal panel 120 being pivoted to the closed position. The walls 107 and 109 are fixed on the screed and are stationary with respect to columns 60.

Access to the hopper 102 is also provided by a removable panel 130 defining a portion of the hopper front wall 110. The panel 130 is mounted to the hopper by bolts 132 and is further held in position by the door structure. The panel 130 provides access to the lower portion of the hopper 102 in alignment with the barrier wall further permitting bases, electrical boxes, and other items to be incorporated into the barrier wall foundation.

The vertical height of the barrier wall 10 is determined by a guideline 136, FIG. 3, located beside the path of movement of the support vehicle 30. The guideline is sensed by a sensing finger 138 connected to appropriate control means 139 mounted for vertical movement with the sidewall 76, such as on hopper wall 105, controlling operation of the motor 100, and rotation of the threaded rods 96. As the guideline 136 will be installed to vertically vary in accordance with the radius of the curve being defined by the barrier wall being formed, the configuration of the barrier wall may be infinitely varied along the length of the wall in accordance with the height and configuration desired.

As the screed sidewall 76 is vertically adjusted the portion 78 will be vertically sliding upon the plate 74, and portion 78, and that portion of the plate 74 below the sidewall portion 78, will define the portion 20' of the barrier wall, FIG. 1. While the lower edge of the plate 78 will define a small step in the wall configuration, this step is located below the grade line 14, and thus may or may not be trowled out or blended in by hand, as desired.

A rubber lip seal, not shown, may be located at the end of portion 84 adjacent the sidewall portion 72 to prevent concrete from extruding between the slight clearance between the plate portion 84 and the wall portion 72. Of course, this clearance is required due to the vertical adjustability of the sidewall 76.

In operation, the support vehicle 30 is located over the foundation 12 such that the lower edges of the screed sidewalls 64 and 74 are substantially disposed upon the top surface of the foundation. The height and position of the screed may be very accurately regulated through the expansible motors 42. The hydraulic motors driving the wheels 36 are energized to slowly move the support vehicle in the direction of the conveyor chute 48, and a stiffly mixed concrete is introduced into the lower portion of the conveyor chute, usually from a ready-mix concrete truck. The concrete is conveyed by auger 50 to the hopper 52, and falls into the screed hopper 102. Vibrators 118 received within the holes 116 vibrate the concrete and eliminate the presence of air and voids therein as the concrete is shaped by the screed sidewalls 64 and 76. The fact that the hopper 102 is filled, insures that the cavity between the sidewalls 64 and 76 will be filled, and as the support vehicle moves forward a barrier wall 10 is formed by the screed. As apparent in FIG. 2, the rear end of the sidewalls 64 and 76 are obliquely disposed to the vertical as to provide a maximum length of support of the lower regions of the wall. As the support vehicle moves through its path of movement, reinforcing mesh 104 may be introduced into the hopper and the screed through the opening 106, and such reinforcement aids in maintaining the form of the barrier wall until the concrete fully hardens.

When it is desired to introduce an electrical box, or the like, into the barrier wall or foundation the pins 128 or bolts 132 are removed from their openings, and the panel 120 is hinged about the pins 124, or the panel 130 is removed. The control box, or the like, is then located within the screed as desired, and then the door 20 or panel 130 is closed, and the operation continues.

Forming of the top surface 26 of the barrier wall is automatically accomplished by portion 84, but if touching up of the upper corners, or any other location of the barrier wall is required, such touching up can be accomplished by means of a hand trowel.

In the previously disclosed embodiment only one sidewall of the screed is vertically adjustable. Thus, the direction of movement of the support vehicle 30 will be determined by the configuration of the wall to be formed.

An embodiment of the invention is illustrated in FIGS. 10 through 13 wherein both sidewalls of the screed are vertically adjustable. This embodiment provides a versatility not possible with the aforementioned embodiment, and eliminates the necessity for the support vehicle to be moving in one direction or the other depending on the direction of barrier wall curvature.

Figure 10:
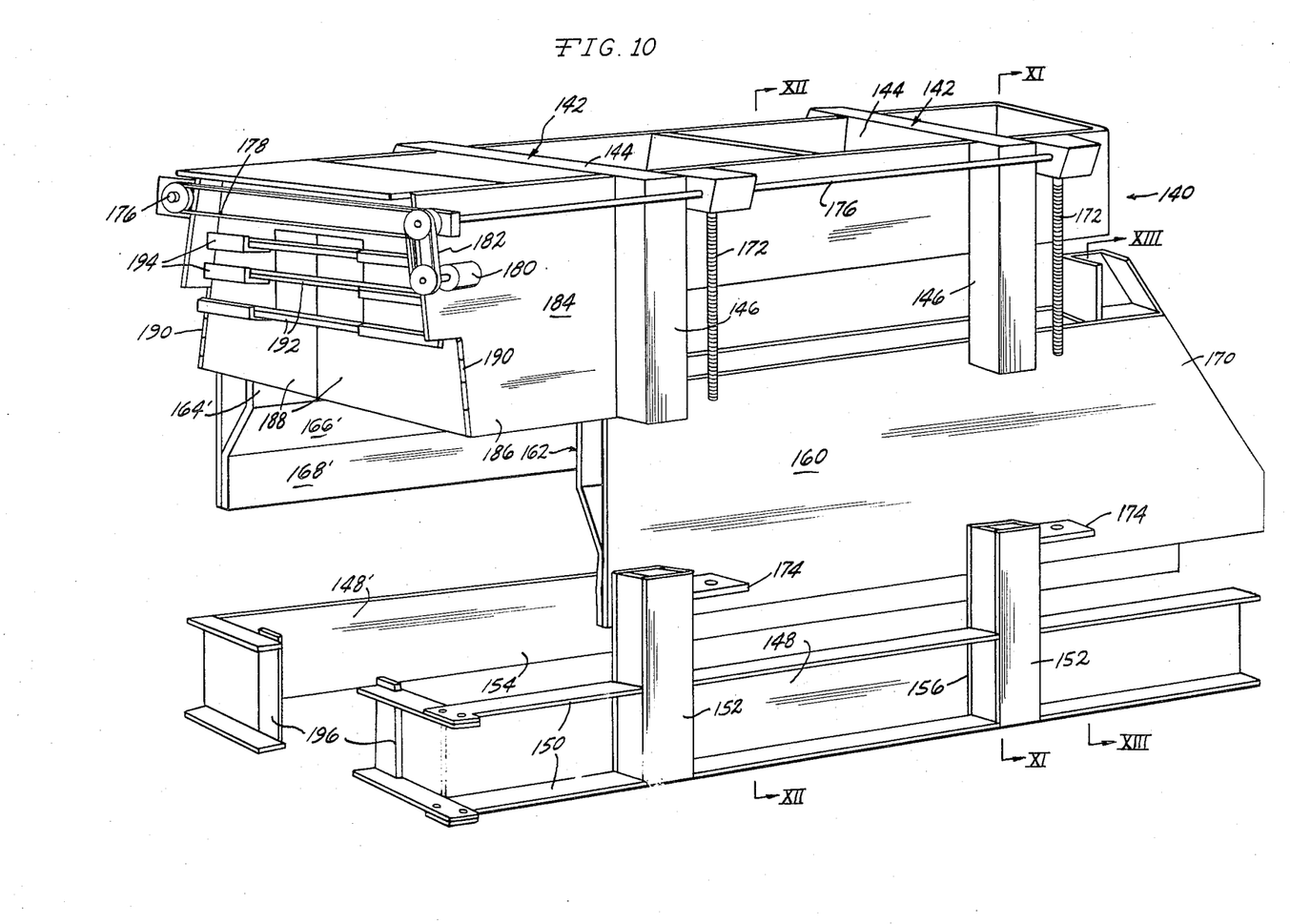
FIG. 10 is a perspective, exploded, view taken from the front and left side of an embodiment of slip form constructed in accord with the invention wherein both sidewalls of the apparatus are vertically adjustable.
Figure 11:
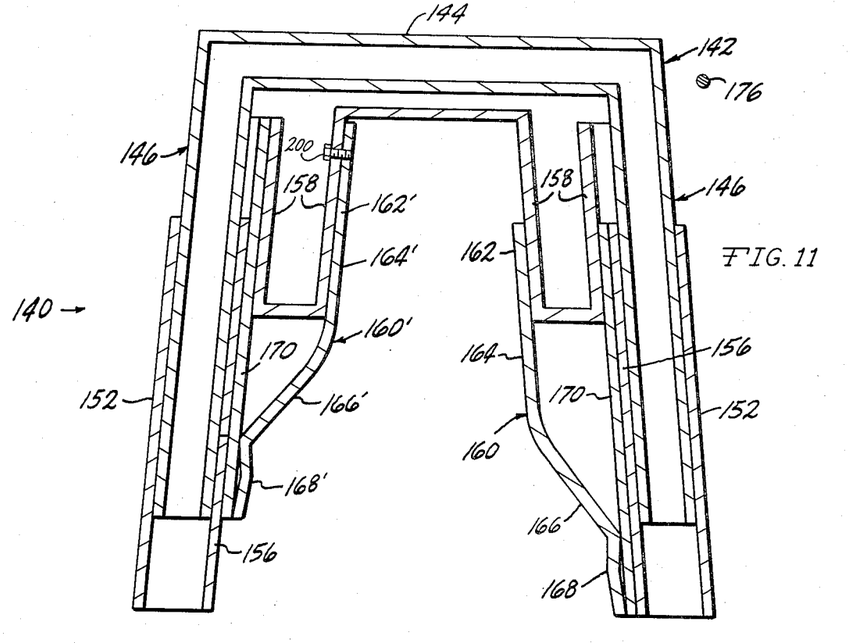
FIG. 11 is an elevational sectional view taken along section XI—XI of FIG. 10 with the components assembled, FIG. 12. is an elevational sectional view taken along section XII—XII of FIG. 10 with the components assembled.

In the embodiment of FIGS. 10 through 13 the screed 140 includes upper bridge and side members 142, FIG. 11, of an inverted U-shaped configuration. The members 142 include a top portion 144 and side portions 146, all of which may be formed of hollow box-like elements.

The lower portions of the screed include planar sidewalls 148 and 148' reinforced by horizontally disposed members 150, and the sidewalls are mounted upon rectangular tubular sleeves 152 into which the side portions 146 are slidably received, FIG. 11. Thus, it will be appreciated that the sidewalls 148 and 148' are vertically adjustable with respect to the portions 146. The sidewalls 148 and 148' include an inner surface 154, and it is to be understood that the inner portion 156 of the sleeves 152 is coplanar with the associated sidewall 148 such that the inner portions 156 form a portion of the screed sidewalls as will be later apparent.

The members 142 serve as a support for spaced guide plates 158 which are received within a pocket in adjustable screed sidewalls generally indicated at 160 and 160'. The screed sidewalls 160 and 160' each include an inner wall 162 having portions 164, 166, 168 which correspond to the portions 24, 22 and 20, respectively, defined on the barrier wall 10 as shown in FIG. 1. Also, the sidewalls include an outer plate 170 slidably engaging the lower sidewalls 148 and 148' and the sleeve portions 156. Thus, the sidewalls 160 and 160' may be telescopically received within the plates 158, and outward movement of the lower region of the adjustable sidewalls is prevented due to engagement with the sidewalls 148 and 148'.

Vertical adjustment of the sidewalls 148 and 148' is achieved through threaded rods 172, two of which are mounted on each screed side as shown in FIG. 10. On the opposite side of the screed 140, not visible in FIG. 10, another pair of threaded rods 172 are used to adjust the sidewall 148', FIG. 11. The threaded rods cooperate with threaded nut plates 174 fixed upon the sleeves 152, and in this manner the sidewalls 148 and 148' may be vertically adjusted with respect to the members 142.

Rotation of the threaded rods 172 is achieved through right angle transmissions connected to a pair of horizontally disposed drive shafts 176, one of which is shown in FIG. 10, and the drive shafts 176 are interconnected by a chain or timing belt drive 178. Rotation of the threaded rods 172 is produced through the hydraulic motor 180, and belt 182 wherein all four of the rods 172 may be simultaneously rotated by the motor.

A hopper 184 is mounted at the front end of screed 140 and includes sides 186 and is open at the top and bottom. The front wall of the hopper is provided with doors 188 hinged at line 190 and the doors are locked in the closed position by removable bars 192 held in brackets 194. Thus, doors 188 provide access to the hopper to permit installation of electrical boxes or the like to be incorporated into the barrier wall or foundation.

The sidewalls 148 and 148' extend upwardly above the lower edge of the hopper sides 186 in close fit therewith and sidewall extensions 196 also closely receive the hopper doors so that the hopper is effective to retain concrete supplied into the open upper end during vertical adjustment of the sidewalls.

In use, the embodiment of FIGS. 10 through 13 may be used to form a highway barrier wall of linear elongation wherein the sides of the formed barrier wall are identical and symmetrical, or the screed may be employed to form a barrier wall curving either to the right or left with respect to the direction of screed movement. Such versatility is due to the ability of the sidewalls 160 and 160' to be individually adjusted as well as the ability to adjust sidewalls 148 and 148'.

Figure 12:
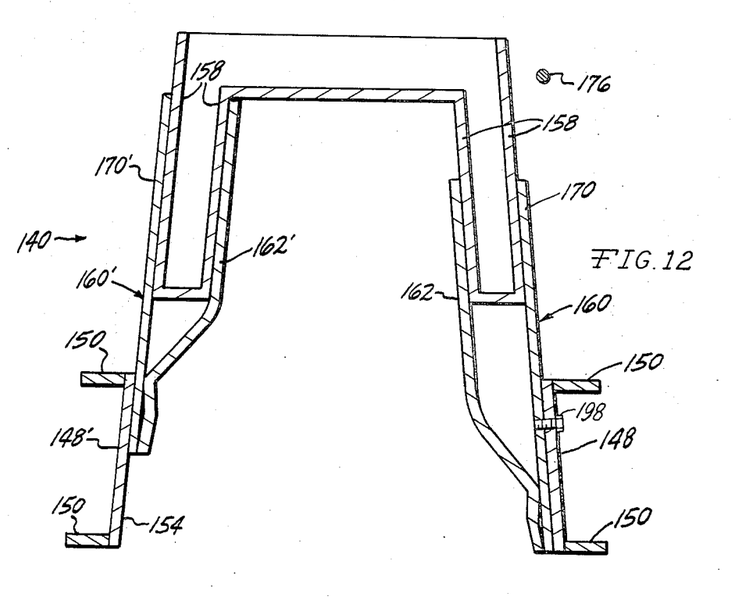
Figure 13:
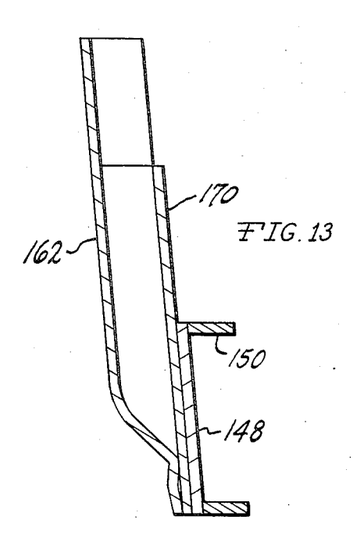
FIG. 13 is an elevational sectional view of the embodiment of FIG. 10 illustrating one sidewall being vertically adjustable higher than the other, as taken along a section similar to XII—XII.

For instance, with reference to FIGS. 11 and 12, if it is desired to vertically adjust the barrier sidewall formed by the screed sidewalls 148 and 160, the sidewall 160 is "locked" to the lower sidewall portion 148 by screw 198, or other conventional structure, not shown. Thus, as the sidewall 148 is raised or lowered by its associated screw rod 172, the sidewall portion 160 will also raise and lower as guided upon the guide plates 158. Simultaneously, the sidewall portion 160' will be fixed to the guide plates 158 by suitable locking means such as screw 200, clamps or the like, not shown, and sidewall 160' will not be vertically displaceable with its associated lower sidewall 148'. However, the sidewall 148', being connected to its screw rod 172 by its associated threaded nut plates 174, will be vertically adjusted simultaneously with the adjustment of sidewall 160, and its associated lower sidewall 148. In this manner vertical adjustment of the vertical height of the screed sidewalls can be accomplished, and the fact that one of the upper sidewall members is fixed relative to the frame, while the other sidewall member is vertically adjustable thereto, will produce the desired asymmetrical configuration required in the resultant barrier wall.

As to which screed sidewalls will be vertically adjusted during operation, and which sidewall will be fixed relative to the members 142 is dependent upon the direction of barrier wall curvature. Either of the sidewalls 160 or 160' may be fixed relative to the member 142, or fixed to its associated adjustable lower sidewall 148 or 148' for vertical movement, as desired, and depending upon the direction of barrier wall curvature. When forming a linear highway barrier wall the sidewalls 160 and 160' may be either both fixed to the members 142, or locked to their associated lower sidewall 148 and 148', depending upon the option of the operator. Of course, it will be appreciated that this versatility of adjustment permits flexibility in the proportional vertical height of the lower and upper portions of the barrier wall, and thus a single screed is capable of forming several barrier wall configurations with respect to the vertical height of the wall portions 20 and 24, for instance.

It is to be noted that in the embodiment of FIGS. 10 through 13 the side portions 146 are obliquely disposed to the vertical converging in an upward direction. This construction permits the sidewalls 160 and 160' to move in a similar direction during adjustment, imparting to the barrier wall a tapered and converging configuration in an upward direction regardless of the particular adjustment of the movable sidewall.

The control of the vertical adjustment of the upper sidewall and the lower sidewall portions, as achieved by the control motor 180, is automatically determined by sensing devices similar to that previously described at 136, 138 and 139. In mounting the control device for the adjustable portions of the screed the control 139 and finger 138 are mounted on an adjustable portion of the screed, such as sidewall 76, wall 105, or on a sidewall portion 148 or 148'. By mounting the control and finger on the movable adjusted portion an automatic "feedback" is achieved which permits rapid adjustment response of a very accurate nature.

Control finger 202 is mounted on a vehicle arm 38 and engages guideline 204 for automatically steering vehicle 30, and a similar guideline may be used in conjunction with a sensing finger mounted on body 34 to control the height of the body and "fixed" portions of the screed with respect to the wall foundation 12.

While the vertical adjustment of the screed sidewalls has been described as primarily desirable when forming a highway barrier wall traversing a curve, it will be appreciated that the vertical adjustment may be used in other situations. For instance, divided highways built on slopes may locate the lanes at different variable elevations, and the concepts of the invention may be practiced to construct a barrier wall between such lanes where the height of the wall and the relationship of the wall sides will vary proportional to the degree of slope upon which the highway is built.

It will therefore be appreciated that the invention is directed to a unique method of forming asymmetrical concrete structures, such as highway barrier walls wherein an infinite adjustability of the barrier sidewalls in a vertical direction is possible. It will therefore be apparent that a unique method and apparatus for forming asymmetrical concrete structures has been achieved, and it is appreciated that various modifications to the inventive concepts may be apparent to those skilled in the art without departing from the spirit and scope of the invention.

I claim:

1. The method of forming a concrete highway barrier separating highway surfaces of different elevation by slip forming wherein the barrier is supported upon a supporting surface and includes oppositely disposed sidewalls of asymmetrical configuration having inwardly obliquely disposed surfaces disposed above the associated highway surface at a substantially equal predetermined vertical height and the wall is formed by a screed having spaced, vertically disposed elongated sides defining the barrier sidewalls, each of said screed sides having an oblique surface portion and lower edges and one of said screed sides having an oblique surface portion vertically adjustable with respect to the other screed side oblique surface portion comprising the steps of translating the screed in a direction parallel to the horizontal length of the screed sides while the screed is filled with a concrete mixture in a moldable state, vertically adjusting the position of the screed with respect to the barrier wall supporting surface during translation of the screed while maintaining the screed lower edges in predetermined relationship to the barrier wall supporting surface and adjusting the vertical height of said one screed side in accord with the difference in elevation of said highway surfaces.

2. The method of forming a concrete highway barrier separating highway surfaces of high and low elevation by slip forming wherein the barrier includes a foundation and oppositely disposed barrier sidewalls each having inwardly obliquely disposed surfaces vertically disposed above its associated highway surface at a substantially equal predetermined vertical height and the barrier sidewalls are formed by an open end screed having first and second spaced vertical screed sidewalls having lower edges, the first screed sidewall having a configuration corresponding to the desired configuration of the barrier sidewall disposed toward the highway surface low elevation and the second screed sidewall including a lower portion, and an upper relatively vertically movable portion having an obliquely disposed portion defining the barrier sidewall oblique surface disposed toward the highway surface high elevation comprising the steps of translating the screed in a direction parallel to the horizontal length of the screed sidewalls while the screed is filled with a concrete mixture in a moldable state, vertically positioning said screed during translation to maintain the screed lower edges of both said first and second screed sidewalls in predetermined relationship with the barrier foundation during screed translation, and vertically adjusting the screed upper movable portion of said second screed sidewall during forming of the barrier to maintain the obliquely disposed portion thereof at a substantially constant height relative to the highway surface high elevation.

3. The method of forming a concrete highway barrier of a longitudinally curved configuration which separates highway surfaces, the highway surfaces having a high elevation adjacent a first barrier sidewall and a low elevation adjacent a second barrier sidewall, the difference between the high and low elevations being proportional to the radius of the barrier in the longitudinal direction, the barrier wall including a foundation and oppositely disposed barrier sidewalls each having inwardly obliquely disposed surfaces vertically disposed above its associated highway surface at a substantially equal predetermined vertical height and the barrier is formed by an open end screed having first and second spaced vertical screed sidewalls having lower edges, the first screed sidewall having a configuration corresponding to the desired configuration of the barrier sidewall disposed toward the highway surface low elevation and the second screed sidewall including a lower portion, and an upper relatively vertically movable portion having an obliquely disposed portion defining the barrier sidewall oblique surface disposed toward the highway surface high elevation comprising the steps of translating the screed in a direction parallel to the horizontal length of the screed sidewalls while the screed is filled with a concrete mixture in a moldable state, vertically positioning said screed during translation to maintain the lower edges of both said first and second screed sidewalls in predetermined relationship with the barrier foundation during screed translation, and vertically adjusting the screed upper movable portion of said second screed sidewall to maintain the obliquely disposed portion thereof at a substantially constant height relative to the highway surface high elevation during forming of the barrier whereby the vertical adjustment of the screed upper movable portion is proportional to the radius of the barrier.

References Cited

UNITED STATES PATENTS

| 3,600,773 | 8/1971 | Davis | 425—62 X |
| 3,254,578 | 6/1966 | Bessette | 404—98 |
| 3,292,511 | 12/1966 | Cheney | 404—98 X |
| 3,665,821 | 5/1972 | Walker | 425—62 X |
| 3,363,524 | 1/1968 | Catenacci | 425—62 X |

ROBERT F. WHITE, Primary Examiner

T. P. PAVELKO, Assistant Examiner

U.S. Cl. X.R.

264—40, 70; 404—98; 425—64